Sept. 7, 1965 E. E. MOYER 3,205,425
VOLTAGE STABILIZED CONVERTER DEVICES
Filed Jan. 8, 1962 5 Sheets-Sheet 2

INVENTOR.
ELMO EMERSON MOYER
BY
Souther & Stoltenberg
ATTORNEYS

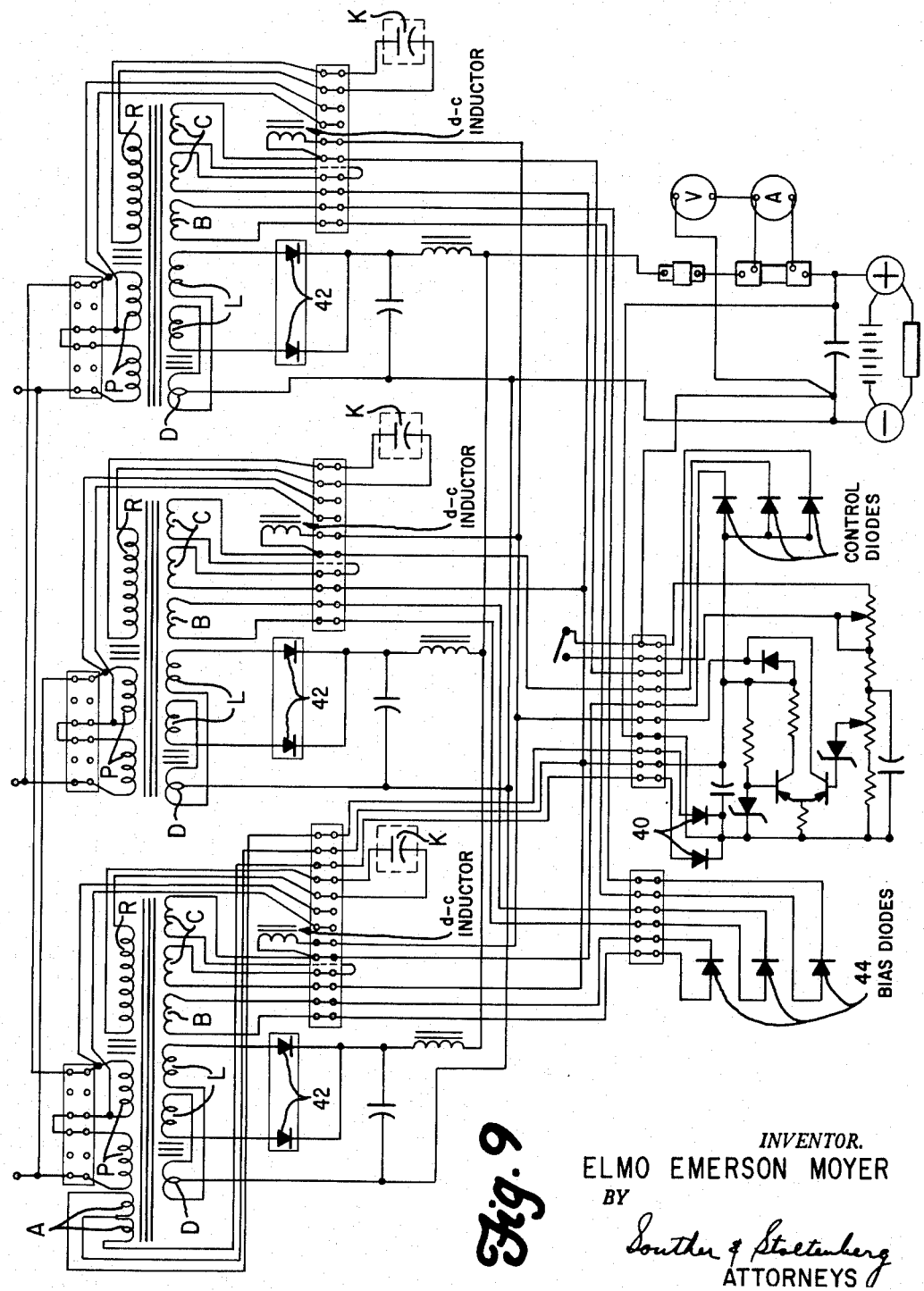

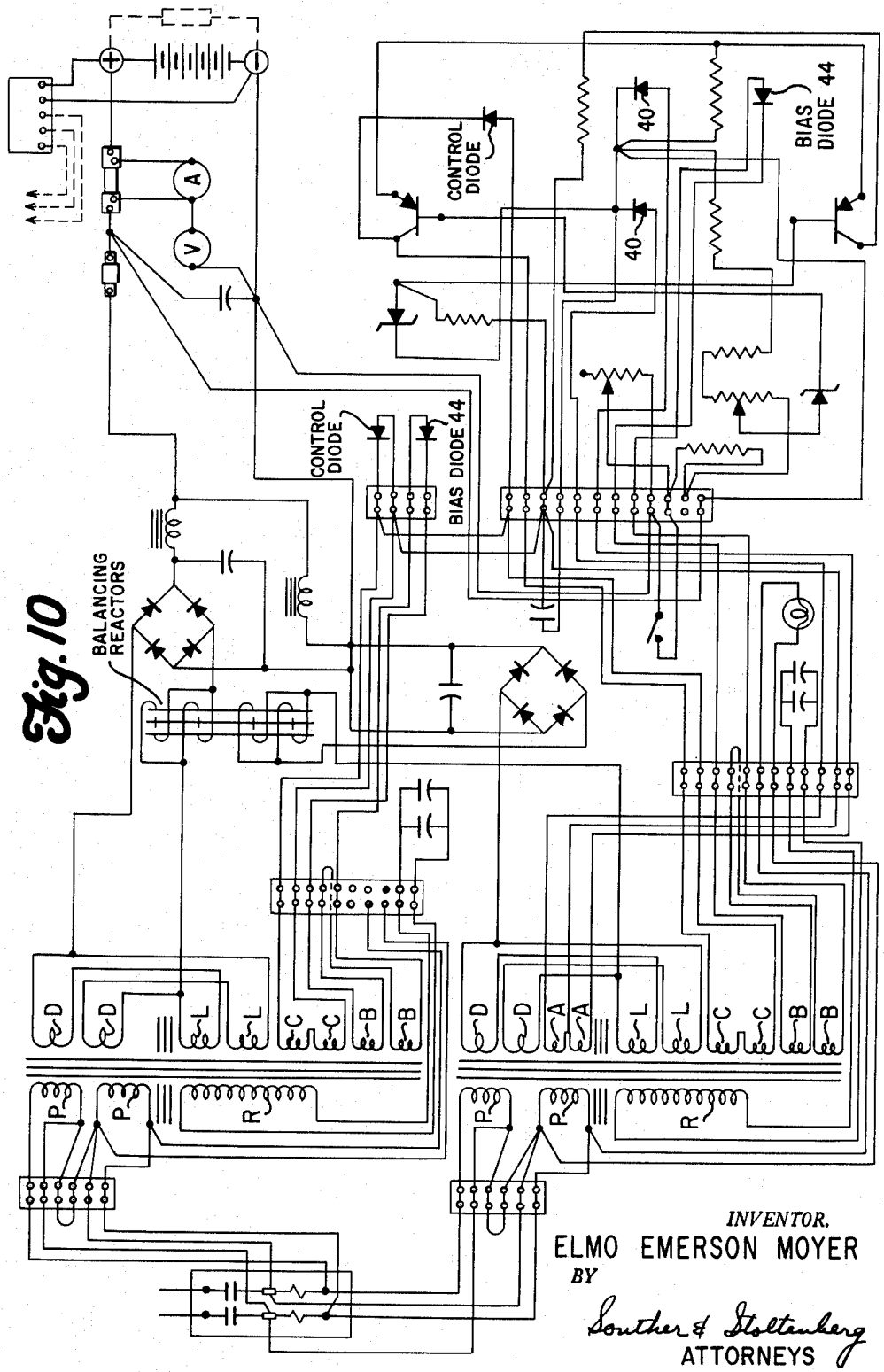

Sept. 7, 1965 E. E. MOYER 3,205,425
VOLTAGE STABILIZED CONVERTER DEVICES
Filed Jan. 8, 1962 5 Sheets-Sheet 5
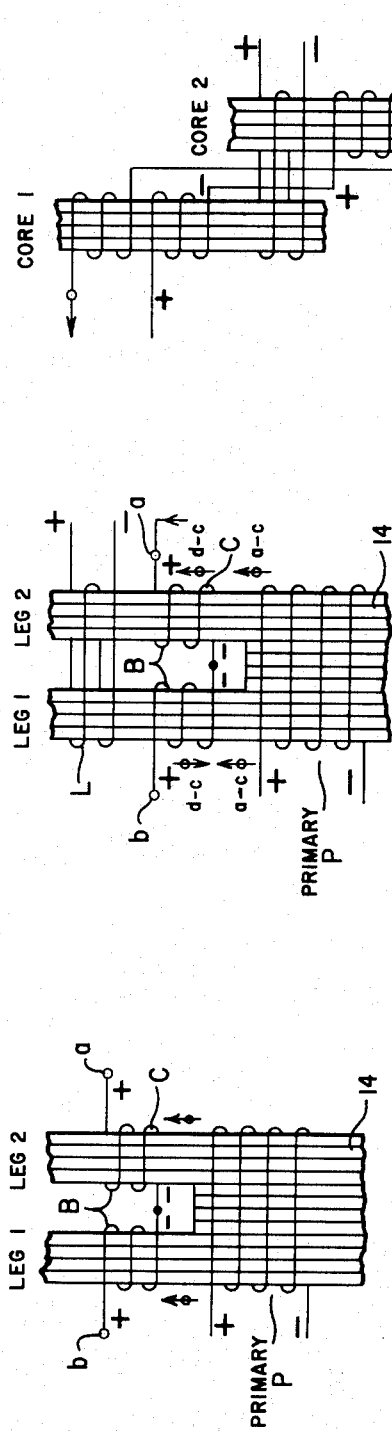
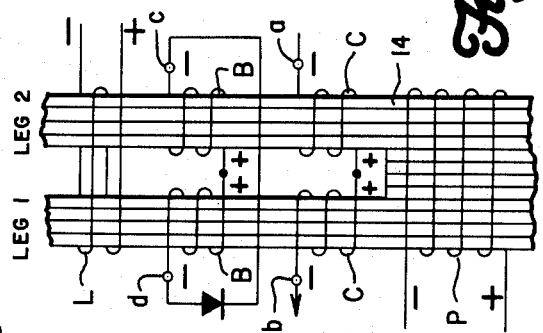
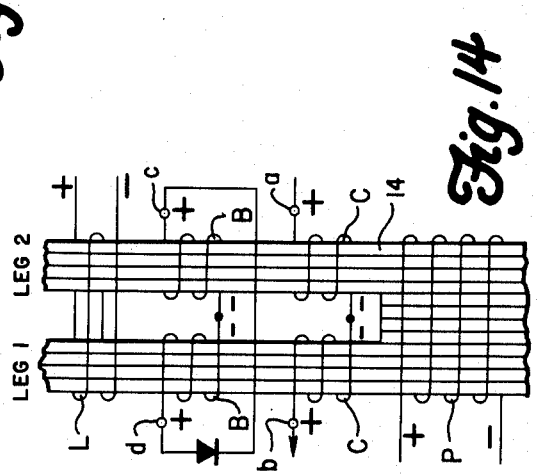
INVENTOR.
ELMO EMERSON MOYER
BY
ATTORNEYS

United States Patent Office 3,205,425
Patented Sept. 7, 1965

3,205,425
VOLTAGE STABILIZED CONVERTER DEVICES
Elmo Emerson Moyer, West Hurley, N.Y., assignor to Eltra Corporation, a corporation of Ohio
Filed Jan. 8, 1962, Ser. No. 173,598
7 Claims. (Cl. 321—18)

This invention relates to voltage regulators, more particularly to voltage regulating devices for use with rectifying apparatus to rectify alternating current from commercial power lines for the purpose of charging and "floating" storage batteries.

Constant potential transformers using resonating secondary circuits such as disclosed in Sola Patent No. 2,143,745, have been in use for many years, but have not been entirely satisfactory for regulating purposes, in that as the load on the transformer increases, a drooping voltage characteristic develops. The present invention obviates the drooping voltage characteristics of this type of transformer by providing a more effective and sensitive magnetic core construction which is capable of being controlled in a manner, so that the voltage can be very closely controlled over wide ranges of loadings to result in a substantially flat voltage characteristic through the load range through which the transformer is to be used. Furthermore, the novel construction of the magnetic core for the transformer is commercially feasible because it is simple in form, utilizing shapes which avoid wasteful use of the expensive magnetic alloys, so that the commercial sale prices can be maintained as low as possible.

The voltage of the load coil is closely regulated by controlling the magnetic flux threading the load coil, which is accomplished by providing control coils on separated magnetic paths for the flux in the core, whereby the saturated conditions in the two branches of the core can be closely controlled to increase or decrease the flux threading the load coils which encompass both branches.

It is, therefore, a principal object of this invention to improve the magnetic core member of a voltage regulating transformer, which incorporates a resonating secondary winding.

It is a further object of this invention to provide an improved laminated magnetic core for a regulating transformer which is fabricated from standard E, I elements to obviate the use of complicated shapes which are expensive to fabricate by wasting a large precentage of the costly magnetic alloys from which the laminations are punched.

It is a further object of this invention to improve the regulating characteristics of a transformer having a resonating secondary winding by providing additional control coils in both the primary and secondary portions of the saturatable magnetic core which will allow the regulation of a substantially flat voltage characteristic for the designed load range.

Other objects and advantages of this invention relating to the arrangement, operation and function of the related elements of the structure, to various details of construction, to combinations of parts and to economies of manufacture will be apparent to those skilled in the art upon consideration of the following description and appended claims, reference being had to the accompanying drawings forming a part of this specification wherein like reference characters designate corresponding parts in the several views.

Referring to the drawings:

FIGURE 9 is a schematic diagram of connections of a 3-phase regulating device incorporating the invention;

FIGURE 10 is a schematic diagram of connections of a 1-phase regulating device incorporating two transformers and rectifiers connected in parallel on the D.-C. side; and FIGURES 11, 12, 13, 14, and 15 are schematic illustrations of the core shown in FIGURE 1 showing the coil relations.

Figure 1:
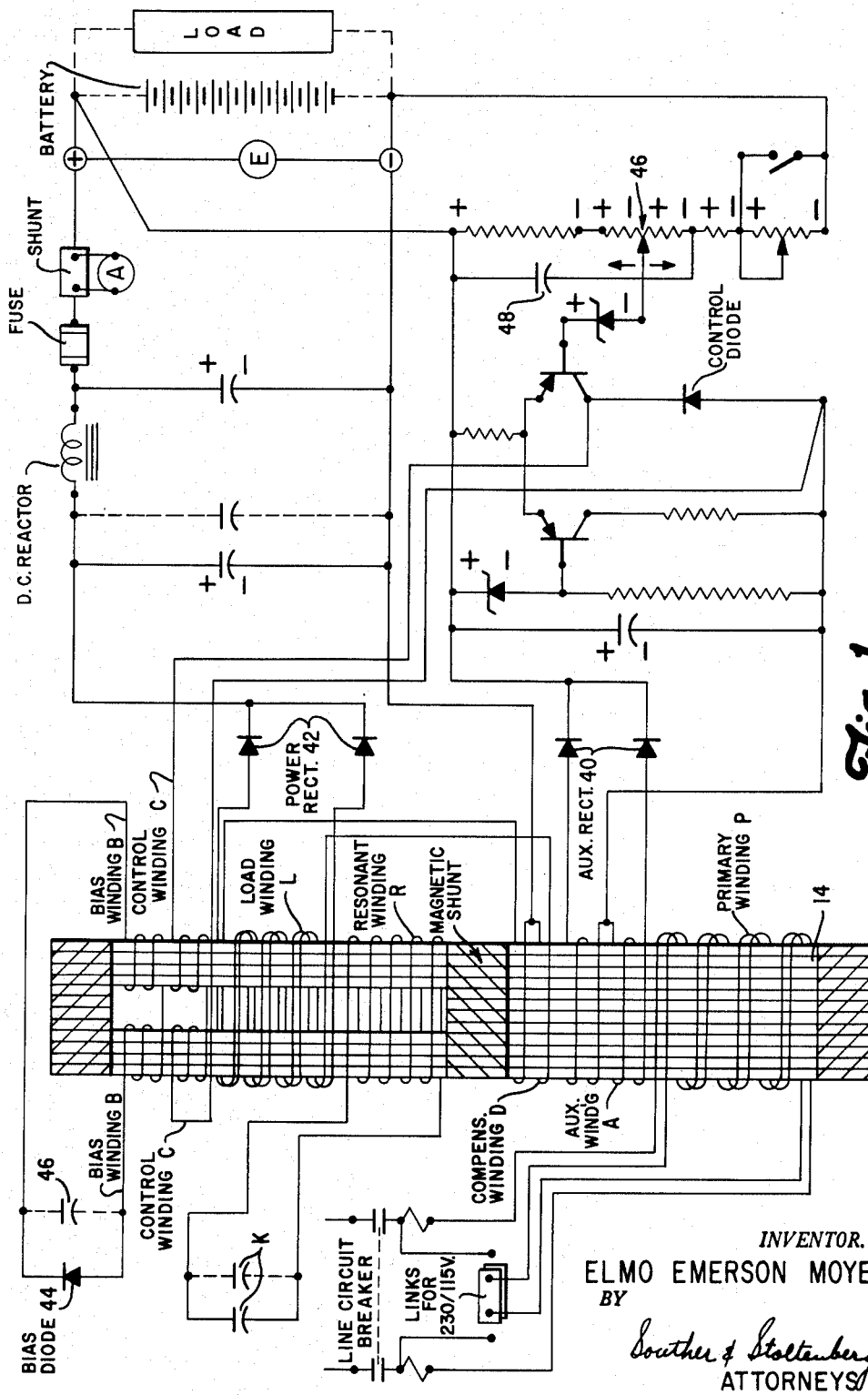
FIGURE 1 is a schematic diagram of connections of the regulating and rectifying circuit utilizing a transformer incorporating the invention.
Figure 2:
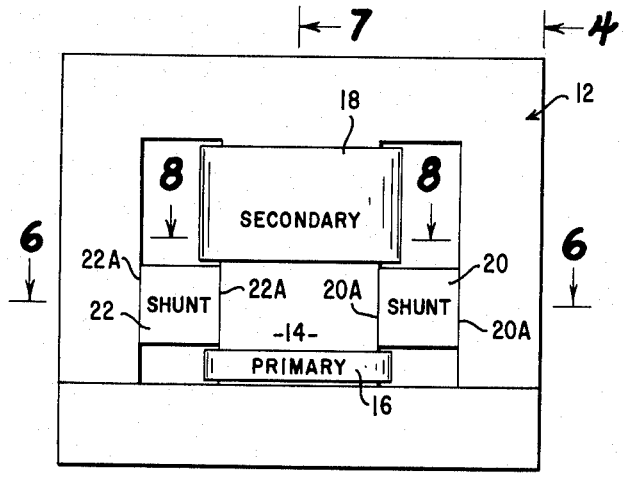
FIGURE 2 is an elevational view of a complete transformer.

Referring to the drawings, particularly to FIGURES 1, 2, 3, and 5, the details of the laminated magnetic core of a transformer incorporating the invention are illustrated. Referring to FIGURE 2, specifically, the transformer consists generally of a rectangular outer magnetic core member 12 and a central magnetic core member 14 on which the primary and secondary coils 16 and 18 are positioned, as will be further described hereinafter. Between the primary coils 16 and the secondary coils 18, magnetic shunt blocks 20 and 22 are provided, which divert a portion of the alternating magnetic flux created by the primary coil 16 traversing the central member 14 of the core to the side members of the outer magnetic core member 12. Air gaps 20A and 22A are formed between the shunt members and the adjacent magnetic core members to provide a high leakage reactance path for a portion of the primary flux. The shunt blocks 20 and 22 are clearly seen in FIGURE 3 where they are positioned immediately below apertures 24, 26, and 28 formed in the magnetic core as will be described further hereinafter.

Figure 5:
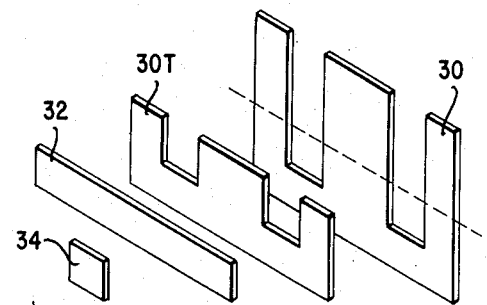
FIGURE 5 is an exploded view of the laminations which are utilized to fabricate the magnetic core.
Figure 6:
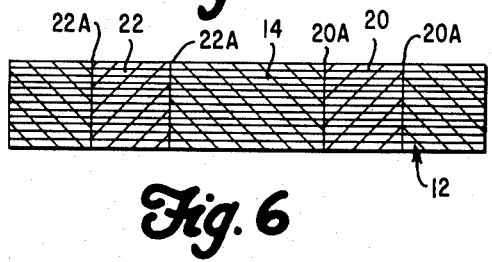
FIGURE 6 is a plan view taken along the line 6—6 of FIGURE 2 with the coils removed.

The magnetic core of the transformer, including the shunt blocks 20, 22, are made from laminations in the usual manner in order to reduce eddy current losses as is well known in the art. The core is built up manually through the use of the various forms of laminations shown in FIGURE 5. The large E laminations 30 and the I laminations 32 form the main portion of the magnetic core, while the shunt blocks 20 and 22 are fabricated from the portion 34 as shown in FIGURE 5, being conveniently held together in any suitable manner such as riveting or by the use of adhesives between adjacent laminations. The method of forming cores by the use of E–I laminations is well known in the art, and will not be described in further detail.

Figure 3:
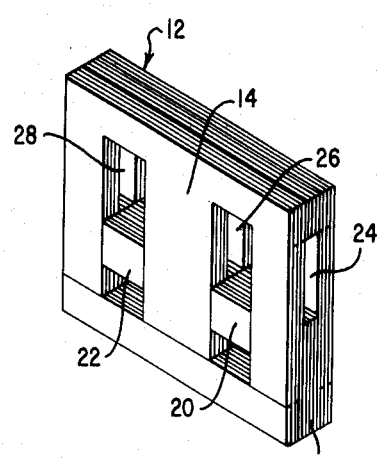
FIGURE 3 is an isometric view of the core of the transformer.

In order to form the apertures 24, 26 and 28 in the parallel legs of the magnetic core, as is most clearly seen in FIGURE 3, a normal E lamination 30 is cut off at the dotted line, as shown in FIGURE 5, to form truncated E portions 30T which are stacked on the primary side of the core to provide the apertures 24, 26, and 28, while the upper transverse member of the core is provided with I laminations 32 until the necessary dimensions of these apertures in a transverse direction are formed, at which time the stacking of the laminations continues until the core is completely formed as shown in FIGURE 3.

Figures 4, 7:
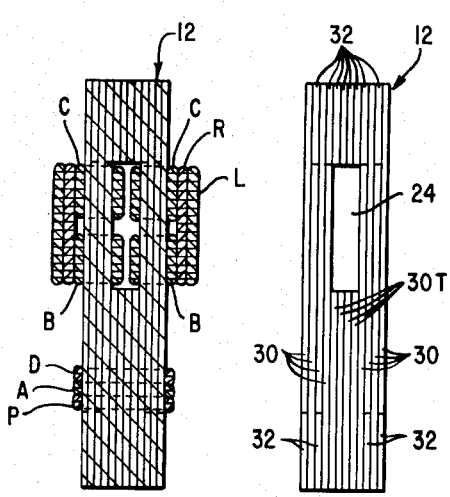
FIGURE 4 is an elevational view taken along the line 4—4 of FIGURE 2 with the windings removed.
FIGURE 7 is an elevational view taken along the lines 7—7 of FIG. 2.
Figure 8:
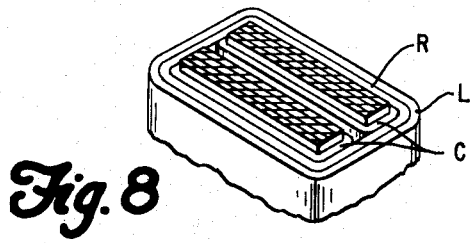
FIGURE 8 is a plan view taken along the line 8—8 of FIGURE 2.

The laminations are stacked into their final cooperative relation with the primary coil 16 and the secondary coil 18 during the fabrication of the core. In order to facilitate the stacking operation, the primary and secondary coils are prewound on a suitable winding machine and provided with suitable insulation before the laminations are stacked in their cooperative relation with the coils to form the complete transformer. The primary coil 16 is of relatively simple conformation, and is designed as a layer wound multiple coil to be positioned on the exterior of the central core member 14 as is best seen in FIGURES 2 and 7. The secondary coil is relatively complicated by being divided into at least three sections, two of which cooperate with the separate core portions adjacent the aperture 26 of the central core member 14 just above the shunt blocks 20 and 22, one coil being provided for each portion of the divided central core member 14 which is brought about by the use of the truncated E laminations 30T in cooperation with the I laminations 32 as is best seen in FIGURES 7 and 8. The third secondary coil is mounted to encompass the first two coils and both portions of the central core member 14, although it could be two separate coils, one around each coil on each leg, and these two separate coils connected in series to produce the same total flux as the single coil, as shown, result in slightly less winding resistance.

Referring now to FIGURES 1, 2, and 7, the transformer can generally be divided into two cooperating sections which are placed in magnetic relation in the core by the magnetic blocks 20 and 22, the primary coil 16 consisting of a primary winding P, an auxiliary winding A, and a compensating winding D, all positioned below the shunt blocks 20 and 22, as shown in FIGURES 1 and 2. The secondary winding is positioned above the shunt blocks and about that portion of the central core member 14 which is pierced by aperture 26, and consists of a resonant winding R and a load winding, L, both of which are positioned around the whole central core member 14, while each of the halves of the central core member 14 separated by the aperture 26 have positioned on them a divided control winding C and a divided bias winding B. The division of the coils is best seen in FIGURES 1 and 7 where the resonant and load windings R and L are positioned in superposed relation, while the divided bias and control coils B and C have their portions positioned in longitudinally spaced relation on the two halves of the divided central core member 14. Other spacings are possible also.

For dual voltage inputs, the primary winding is preferably divided into two identical halves with four leads from the halves leading to a control block where the transformer may be adapted for operation for, say, either 230 or 115 volts, depending upon the manner in which the like halves of the primary are connected together. The auxiliary winding on the primary side is also divided into two identical halves connected in series to provide a central tap between the coils. The two outer terminals of the halves are connected to auxiliary rectifiers 40 to provide power for a control device which will be described in further detail hereinafter. In a similar manner, the compensating winding in the primary is also divided into identical halves connected in series to provide a center tap and two end terminals which cooperate with the load winding in the secondary portion of the transformer as will be described hereinafter.

As pointed out hereinbefore, the secondary winding includes the resonant winding R, which is wound about both halves of the central member 14 of the core just above the shunt members 20 and 22. The terminals of this resonant winding are connected across capacitors K which are positioned adjacent the transformer to provide a resonating circuit operating at the same frequency as the frequency of the primary coil. The load winding L of the secondary is also bifilar wound in two identical portions which are connected in series voltages opposing, with the halves of the compensating winding D of the primary described hereinbefore. The terminal ends of the load winding L are connected to power rectifiers 42, as seen in FIG. 1, to provide full wave rectification for the output of the load winding. The power rectifiers 42 on their opposite sides are connected to a common point and form the positive terminal of the load circuit, while the negative terminal of the load circuit is connected to the central tap of the compensating winding forming a part of the primary. If so desired, the rectifiers could be polarized, so that their common point would be NEGATIVE, while the C.T. of the compensating winding would be POSITIVE, in which case, the excitation to BIAS AND CONTROL windings would be altered accordingly, or, a BRIDGE rectifier connection could be used.

The load circuit may be provided with capacitors and direct current reactors to smooth out any ripples which occur in the load circuit. As is well known in the art, indicating and protective devices, such as fuses, ammeters, and voltmeters, are conveniently connected to the load circuit to enable an operator to ascertain the operating conditions of the regulating circuit. In this example, the load is shown as a battery in part which is adapted to be charged by the regulating device disclosed in order to provide electric power to a suitable load which is connected in parallel with the battery as shown in FIGURE 1.

The secondary section of the transformer is also provided with a control winding C which is divided into two identical portions wound in the same directions on each of the halves of the central core member 14 located above the shunt blocks 20 and 22. These two similar portions of the control winding are connected in series with their A.C. induced voltages opposing in polarity and their terminals are connected to a special regulator responsive to load voltage which will be described in further detail hereinafter. The secondary winding is also provided with a divided bias winding which is wound in the same direction in two identical portions positioned on the two halves of the central core member 14 and connected in series with their A.C. induced voltages opposing in polarity as is best seen in FIGURE 1. The portions of the bias winding B, are connected in series with each other and are then connected to a bias diode 44 which may be paralleled by a fixed capacitor 46 in order to control the flux threading the two halves of the bias winding. As has been mentioned, the halves of the bias coils B are connected in series in such a manner that the alternating potential induced in each half cancels that induced in the other half. The halves of the direct-current control coils C are connected in series in such a manner that the A.C. induced voltages cancel in polarity and it will be found that the D.C. flux in the central core portions on which they are mounted will be in opposite directions. The relation between the halves of the alternating-current bias coil and the halves of the direct-current control coil is such that the A.C. and D.C. fluxes in one portion of the central core portion 14 will add to produce a saturated condition, while at the same instant in the other portion of the central core portion, the fluxes oppose each to produce a maximum impedance condition. On the next succeeding half cycle of the A.C. current, the core conditions in the two halves of the central core member 14 will exchange, so that the combined effect in the two core portions is to reduce the voltages induced by the primary 16 in the resonant coil R and the load coil L in that they are coupled to the fluxes in the two core portions.

The bias diode 44, which is connected across the end terminals of the two induced-voltage-opposing, series connected bias windings B, serves the very important purpose of coupling these two windings together with respect to the unidirectional current which results from the net instantaneous difference in the induced voltages of these two windings when the core legs are being presaturated by a direct current through the two control windings C.

To explain the action of this diode, reference is made to FIGURE 11 which shows, in simplified form, the arrangement of primary and control windings C on the two halves or legs of the core 14. If unimpeded, primary flux is assumed to divide equally between the two core legs. This induces equal voltages in the two control windings, and since the windings are connected in voltage opposition, no net voltage appears across the terminals "a"

and "b." Now, consider that a unidirectional current, from a high impedance source, is caused to flow in the control windings C. FIGURE 12, which now includes a load winding L, shows the direction of the fluxes in the two halves or legs of the core resulting from an arbitrary direction of control current. The D.C. flux would ADD to the A.C. flux in leg 2 and SUBTRACT in leg 1. In other words, A.C. flux would have opposition to passage via leg 2, which opposition would not be present in leg 1. Hence there would be a tendency for all of the A.C. flux to shift into leg 1 to the neglect of leg 2. This being the case, the winding turns on leg 1 would experience more induced voltage than those of leg 2 and the two induced voltages of the control windings would become unequal, that of leg 2 decreasing and that of leg 1 increasing. However, the induced voltage of the load winding, being the result of the summation of the effect of the A.C. fluxes in both legs might remain unchanged. Thus, the circuit behaves like two independent core transformers, primaries in series and secondaries in series, as shown in FIGURE 13. Now, when anything tends to reduce the impedance of core 2 of FIGURE 13, it will tend to shift the whole of the supply voltage onto the primary winding of core 1, so that all voltages of core 1 will be increased accordingly. The load winding, which is common to both cores, may be likened to two windings in series, one on each core, hence the total voltage is unchanged. (This assumes that core 1 does not reach saturation of flux, and the opposition flux of the control winding helps prevent saturation.)

Now, let there be another winding on each core leg, the bias windings B, which are series connected in voltage opposition with the end-terminals c and d connected to a shunting diode 44, as shown in FIGURE 14. Control current flowing into terminal a and out of terminal b of the control windings has been shown to decrease the induced voltages of the coils on leg 2 and increase the induced voltages of the coils on leg 1, so that there is a NET induced voltage dominated in magnitude and polarity by that of the coil on leg 1, hence POSITIVE polarity is obtained at d and NEGATIVE polarity at c. Then, if shunting diode 44 is polarized to receive current from d and deliver current to c, the two coils are effectively connected together and their voltages must equalize (assuming negligible resistance and leakage reactance). If the voltages must equalize, so too must all other voltages of similar coils similarly connected. Hence, the lower voltage coil becomes a load on the higher voltage coil, and the low impedance of the coil on the saturating leg becomes a low impedance in parallel with the high impedance of the coil on the unsaturated leg, thus dragging its high impedance down to a low level. Thus, saturation of one core leg affects the unsaturated leg in such a manner that A.C. flux cannot be diverted into the unsaturated leg and hence total flux linking the load coil is reduced which is what has been desired. The presence of the primary core shunts, 20 and 22, allows the secondary flux to be decreased without imposing short-circuit conditions on the primary winding by providing a path for excess primary flux which now cannot link the secondary load winding.

FIGURE 15 shows the conditions on the successive A.C. half-cycle when the polarities are reversed. Now it is leg 1 which is saturated while leg 2 is unsaturated. The induced voltages have reversed, but that of the bias and control windings B and C on the unsaturated leg 2 are dominant and the required current through the shunting diode is *unchanged in direction.*

The bias winding B would not be needed if a shunting diode were connected across the control winding where its coupling behavior would be much the same. However, there may be reasons and other conditions for not wanting a diode across the control winding, yet needing its behavior, a bias winding serves to provide action while isolating this condition from the conductive paths associated with the control winding. One justification for the use of a bias winding and its diode is that many turns could be used on the bias winding, so that the induced voltages would be large compared to the voltage drop of the diode to make the coupling more effective. Few turns are desirable on the control windings, so that the induced voltage appearing as an inverse voltage across the diode is comparable to, and preferably less than, the voltage of the auxiliary D.C. source from which the control current is derived.

As has been pointed out hereinbefore, a special regulating mechanism is provided for the purpose of more accurately controlling the voltage characteristics of this constant-voltage transformer. Power to operate the special regulating device may be provided by auxiliary rectifiers 40 receiving power from the auxiliary winding in cooperative relation with the primary winding below the magnetic shunt blocks 20 and 22, although, with proper polarity and magnitude of output voltage, the output voltage may be used as the source of auxiliary power. However, there may be some voltage compensating features against changes in A.C. supply voltage when the auxiliary power is derived directly from the primary source. The opposite sides of the auxiliary rectifiers 40 are connected together and provide the positive terminal for the special regulating device which is also connected to the positive terminal of the load circuit as is clearly seen in FIGURE 1. The negative terminal of the load circuit is connected to a control resistor 46 in parallel with the load and which is shunted by a capacitor 48 in part and provided with a potentiometer contact for the purpose of increasing or decreasing the voltage being regulated, depending upon the direction in which the movable contact is moved. Special regulating devices of this kind are well known in the art and perform a function which is well understood by a man skilled in the art. The regulating device shown consists of a pair of transistors connected in circuit with a Zener diode which provides a voltage reference. Another Zener diode cooperates with the transistors to provide a circuit-leveling coupling, while a control diode whose function has been explained hereinbefore is also provided connected across the terminals of the control coil already described. The purpose of the special regulating device is to control the amount of current which is allowed to flow in the control winding of the secondary by the action of the control diode which is connected in parallel with the control winding as clearly shown in FIG. 1. As the voltage at the load increases beyond the predetermined figure, the special voltage regulating device shown will cause a current to flow in the control winding of the secondary to change its flux relations, so that a saturated condition obtains in the portions of the central core member 14 to reduce the flux which threads the load winding to thereby reduce the voltage which is being supplied to the power retcifiers 42. In a similar manner, if the voltage at the load falls below the predetermined value, the special regulating device will cause the control current to change the conditions in the control winding of the secondary to increase the flux threading the load winding to thereby increase the voltage which is supplied to the power rectifiers 42. This is accomplished by controlling the saturated condition of the two magnetic portions of the central core member 14 which allows more flux to thread the load winding.

The connection shown in FIG. 1 is a single phase circuit which is suitable for relatively small power requirements. In the event greater power is necessary to satisfy the load conditions at the battery, the same regulating transformers and rectifying devices can either be connected in parallel, as shown in FIG. 10, or they can be connected in a 3-phase relation, as shown in FIG. 9. In the single phase case of FIGURE 10, the special regulating device is connected to the load in the same manner as the single phase connection shown in FIGURE 1 with the control coils in the secondary circuit of both stabilizers being in series and controlled by the one special regulator in the same manner through their separate control circuit shunting diodes. In the 3-phase connection of FIGURE 9, the control coils and their shunting diodes are paralleled through separate D.C. inductors fed from one shunting diode, and only one auxiliary primary winding A is necessary inasmuch as there is only one regulating device to be energized.

It will be noted that the diagram of FIGURE 1 and FIGURE 9 employ a center tap rectifier circuit whereas that of FIGURE 10 shows bridge circuits; the type of rectifier circuit is immaterial to the behaviour of the regulating function of the control coils of these stabilizers.

It is to be understood that the above detailed description of the present invention is intended to disclose an embodiment thereof to those skilled in the art, but that the invention is not to be construed as limited in its application to the details of construction and arrangement of parts illustrated in the accompanying drawings since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a constant potential transformer, the combination of a closed magnetic circuit comprising first and second core portions, a first winding on said first core portion adapted to be connected to a source of alternating current of fluctuating voltage, a second winding on said second core portion in circuit with a rectifier, said magnetic circuit providing a high leakage reactance path for a portion of the flux threading through said first core portion, a third winding on said second core portion connected in a resonant circuit including a capacitor to maintain the magnetic density in said second core portion at a predetermined value irrespective of the voltage impressed upon said first winding, the portion of the magnetic core position in said second and third windings being divided into two parallel paths and a control winding responsive to the rectified voltage of said second winding positioned on the separate halves on said divided magnetic core section to control the magnetic flux threading said second coil to maintain the voltage thereof at a predetermined value.

2. In a constant potential transformer, the combination of a closed magnetic circuit comprising first and second core portions, a first winding on said first core portion adapted to be connected to a source of alternating current of fluctuating voltage, a second winding on said second core portion in circuit with a rectifier, said magnetic circuit providing a high leakage reactance path for a portion of the flux created by said first winding, a third winding on said second core portion connected in a resonant circuit including a capacitor to maintain the magnetic density in said second core portion at a predetermined value irrespective of the voltage impressed upon said first winding, the portion of the magnetic core positioned in said second and third windings being divided into two parallel paths and a control winding responsive to the rectified voltage of said second winding positioned on the separated halves of said divided magnetic core section and polarized in opposite directions thereon to control the magnetic flux threading said second coil to maintain the voltage thereof at a predetermined value.

3. In a constant potential transformer, the combination of a closed magnetic circuit comprising first and second core portions, a first winding on said first core portion adapted to be connected to a source of alternating current of fluctuating voltage, a second winding on said second core portion, said magnetic circuit providing a high leakage reactance path for a portion of the flux threading through said second winding, a third winding on said second core portion connected in a resonant circuit including a capacitor to maintain the magnetic density in said second core portion at a predetermined value irrespective of the voltage impressed upon said first winding, the portion of the magnetic core positioned in said second and third windings being divided into two parallel paths, and means to rectify the voltage of said second winding, a D.C. control winding responsive to the rectified voltage of said second winding positioned in separated halves on said divided magnetic core section to control the magnetic flux threading said second coil to maintain the voltage thereof at a predetermined value.

4. In a constant potential transformer, the combination of a closed magnetic circuit comprising first and second core portions, a first winding on said first core portion adapted to be connected to a source of alternating current of fluctuating voltage, a second winding on said second core portion, said magnetic circuit providing a high leakage reactance path for a portion of the flux threading through said first winding, a third winding on said second core portion connected in a resonant circuit including a capacitor to maintain the magnetic density in said second core portion at a predetermined value irrespective of the voltage impressed upon said first winding, the portion of the magnetic core position in said second and third windings being divided into two parallel paths, means to rectify the voltage of the second winding, a fourth winding on the second core portion shunted by a diode, and a D.C. control winding responsive to the rectified voltage of said second winding positioned in separated halves on said divided magnetic core section to control the magnetic flux threading said second coil to maintain the voltage thereof at a predetermined value.

5. In a constant potential transformer, the combination of a closed magnetic circuit comprising first and second core portions, a first winding on said first core portion adapted to be connected to a source of alternating current of fluctuating voltage, a second winding on said second core portion in circuit with a rectifier, said magnetic circuit providing a high leakage reactance path for a portion of the flux threading through said first winding, a third winding on said second core portion connected in a resonant circuit including a capacitor to maintain the magnetic density in said second core portion at a predetermined value irrespective of the fluctuating voltage impressed upon said first winding, the portion of the magnetic core positioned in said second and third windings being divided into two parallel paths and an A.C. bias winding and a D.C. control winding, the latter being responsive to the rectified voltage of said second winding positioned in separated halves on said divided magnetic core section to control the magnetic flux threading said second coil to maintain the voltage thereof at a predetermined value.

6. In a constant potential transformer, the combination of a closed magnetic circuit comprising first and second core portions, a first winding on said first core portion adapted to be connected to a source of alternating current of fluctuating voltage, a second winding on said second core portion, said magnetic circuit providing a high leakage reactance path for a portion of the flux threading through said first winding, a third winding on said second core portion connected in a resonant circuit including a capacitor to maintain the magnetic density in said second core portion at a predetermined value irrespective of the fluctuating voltage impressed upon said first winding, the portion of the magnetic core positioned in said second and third windings being divided into two parallel paths, means to rectify the voltage of the second winding, a fourth winding polarized in opposite directions on the two parallel paths of the second core portion and shunted by a diode, a D.C. control winding positioned in separated halves and polarized in opposite directions on the two parallel paths of said divided magnetic core section to control the magnetic flux threading said second coil to maintain the voltage at a predetermined value, and a control means for the control winding responsive to the rectified voltage of the second winding.

7. In a constant potential transformer, the combination of a closed magnetic circuit comprising first and second core portions, a first winding on said first core portion adapted to be connected to a source of alternating current of fluctuating voltage, a second winding on said second core portion, said magnetic circuit providing a high leakage reactance path for a portion of the flux threading through said first winding, a third winding on said second core portion connected in a resonant circuit including a capacitor to maintain the magnetic density in said second core portion at a predetermined value irrespective of the voltage impressed upon said first winding, the portion of the magnetic core positioned in said second and third windings being divided into two parallel paths, means to rectify the voltage of the second winding, a divided fourth winding on the two parallel paths of the second core portion and shunted by a diode, a divided D.C. control winding positioned on the two parallel paths of the second magnetic core section to control the magnetic flux threading said second coil to maintain the voltage thereof at a predetermined value, and a D.C. control means including a diode connected across the control winding responsive to the rectified voltage of the secondary winding.

References Cited by the Examiner

UNITED STATES PATENTS

| 2,465,798 | 3/49 | Granfield | 336—234 |
| 2,550,500 | 4/51 | Schell | 336—234 |
| 2,997,644 | 8/61 | Weinberg | 323—56 |
| 3,015,772 | 1/62 | Rochelle | 323—56 |

LLOYD McCOLLUM, *Primary Examiner.*